United States Patent [19]
Fan et al.

[11] Patent Number: 5,812,115
[45] Date of Patent: Sep. 22, 1998

[54] COMPOSITE MOUSE ASSEMBLY

[75] Inventors: Cheng ge Fan, Kewalram Hillview, Singapore; Fei Ning, JiNam, China; Zhi Zhao Chou, Hillview, Singapore; Wen Jun Zhuang; Qing Gao, both of Singapore, Singapore

[73] Assignee: Aplus, Inc., Charlotte, N.C.

[21] Appl. No.: 783,023

[22] Filed: Jan. 14, 1997

[51] Int. Cl.$^6$ ...................................................... G09G 5/08
[52] U.S. Cl. ........................................... 345/163; 345/158
[58] Field of Search .................................... 345/163, 156, 345/157, 158

[56] References Cited

U.S. PATENT DOCUMENTS

| D. 363,712 | 10/1995 | Yamada | D14/100 |
|---|---|---|---|
| 4,754,268 | 6/1988 | Mori | 345/163 |
| 5,706,031 | 1/1998 | Brendzel et al. | 345/172 |

OTHER PUBLICATIONS

Computer Shopper, David Stone, v18, n2, p254, Feb. 1998.

*Primary Examiner*—Jeffery A. Hofsass
*Assistant Examiner*—Julie Lieu
*Attorney, Agent, or Firm*—Adams Law Firm, P.A.

[57] ABSTRACT

A composite mouse assembly for a computer includes a mouse case. A computer interface encoder is contained in the mouse case. A positional sensor is connected to the interface encoder for controlling a screen indicator used for selecting menu items appearing on a display screen of the computer. A wireless remote control device is connected to the positional sensor and includes a plurality of user-activated direction control keys for transmitting digital serial encoded signals. A receiver unit is contained in the mouse case for receiving and amplifying the digital signals transmitted by the remote control device. A decoder is provided for interpreting the digital signals transferred by the receiver unit into one of a plurality digital direction control signals corresponding to the direction control keys of the remote control device. A converter converts the digital direction control signals to analog signals. The analog signals are transferred to respective input ports of the positional sensor of the interface encoder to control the position of the indicator on the display screen.

3 Claims, 4 Drawing Sheets

COMPOSITE MOUSE ASSEMBLY

TECHNICAL FIELD AND BACKGROUND OF THE INVENTION

This invention relates to a composite mouse assembly used for selecting menu items appearing on the screen of a computer. The invention combines both remote and local control ability into one unit.

Formerly, most mice are corded mice. They are connected to the computer by a cord. The advantages are convenient to use, flexible to control, high accuracy, and no need to use battery. But they also have the disadvantage of limiting the operation within a short distance. Now, there are also mice which take advantage of remote control mode. The control distance reaches about 8 meters. But they are not suitable for short-distance operation. Compared with corded mice, they have lack of accuracy and flexibility. They are not appropriate for depicting complex shapes. They also have the disadvantage of using special devices and being expensive.

SUMMARY OF THE INVENTION

The intention of this product is achieved as follows: attach the remote control signal receiver and decoder to the same container of the corded mouse. According to the different remote control signal, use the Digital-to-Analog-Converter (DAC) to imitate the corresponding position changing and press-key control signals. After combining these signals with the real mouse control signals, they are loaded to the same computer interface encoder at the same time to accomplish the dual-functional control. In the DAC, we use the 74HC14 and Resistors and Capacitors (RC) devices to form an oscillator, its frequency will determine the moving speed when the composite mouse is used in remote control state. We use the RC devices to form the waveform delay mechanism to generate the second series of waveforms which have the fixed phase difference. Two Integrated Circuit (IC) chips (CD4066) are utilized to cooperate with the four-direction signals (top, down, left, right) transmitted by the decoder to transfer the two series of waveforms with fixed phase differences to the input ports of the horizontal and vertical position sensors of the computer interface encoder. This accomplishes the Digital-to-Analog conversion. In addition, to satisfy the requirements of the ergonomic, protruding veinings are designed on the case of the mouse and the remote controller. This product also has a frame to store the mouse.

Compared with various kinds of mice available by now, the composite mouse has the advantage of low-cost, convenient to use, capable of changing operation modes between remote control and local state freely. In local operation state, it gets power supply from the computer. It is highly compatible and can be installed immediately without any adjustment to the computer. Since protruding veinings are designed on the surface of the case, it is very comfortable to use.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
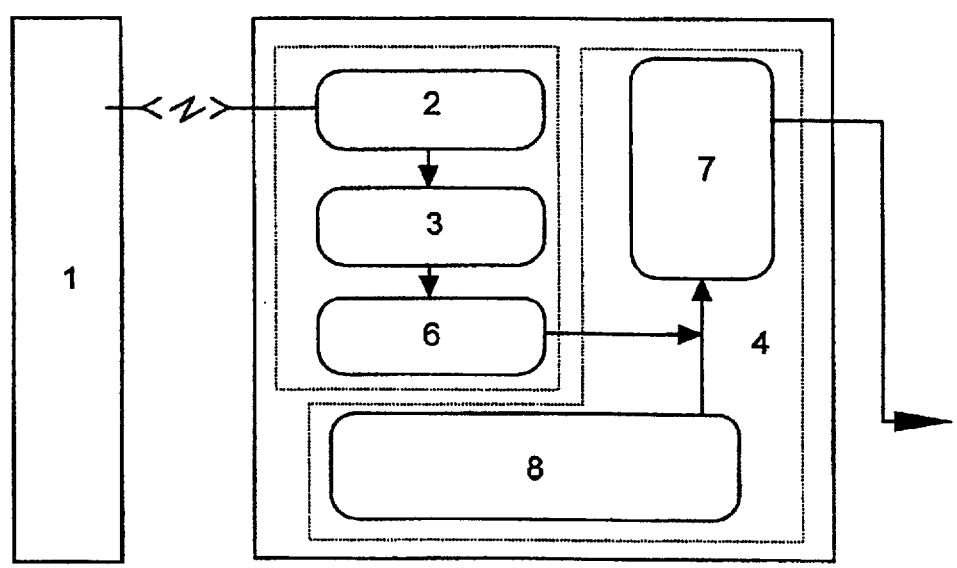
FIG. 1 is the principle block diagram.
Figure 2:
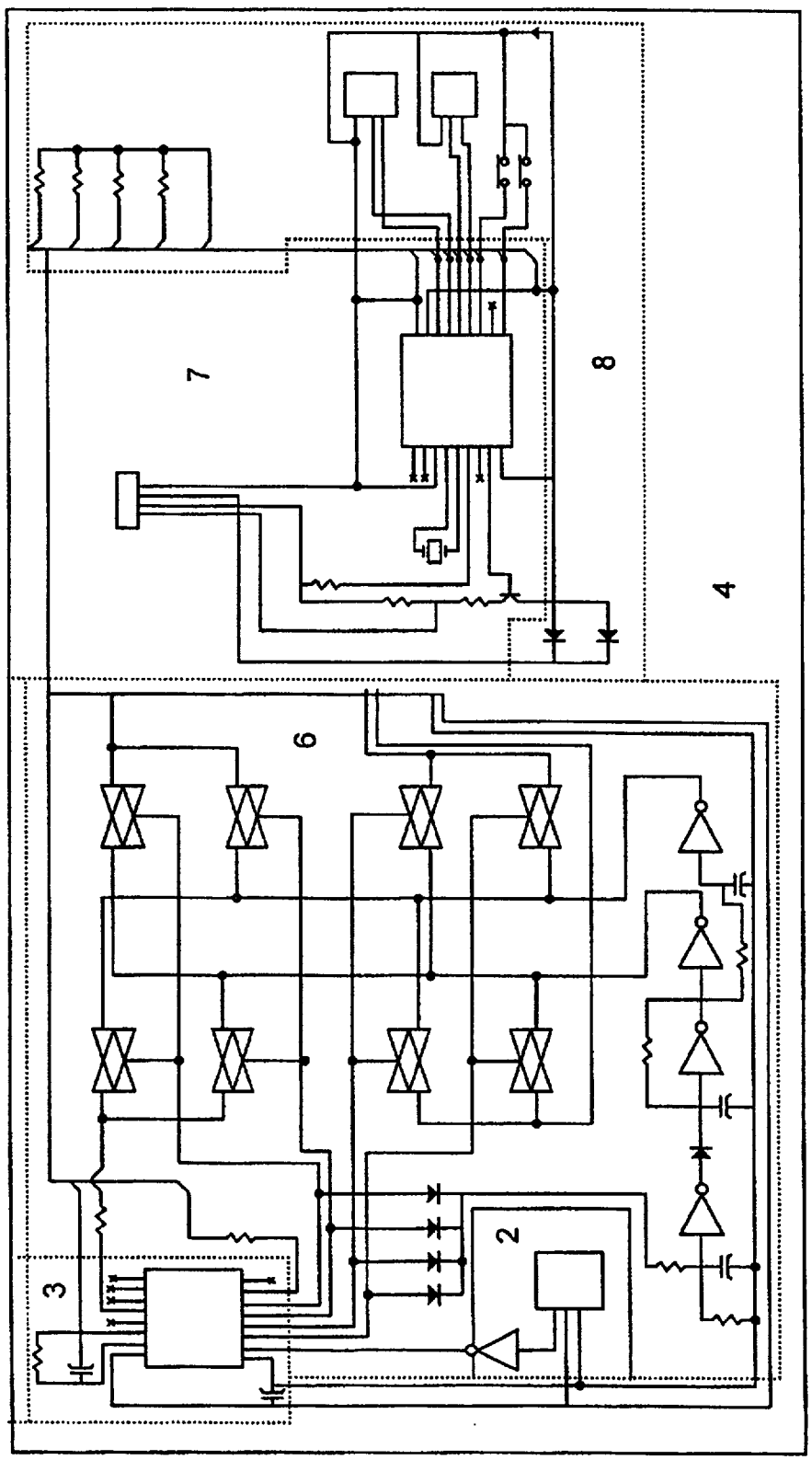
FIG. 2 is the schematic diagram of the mouse.
Figure 3:
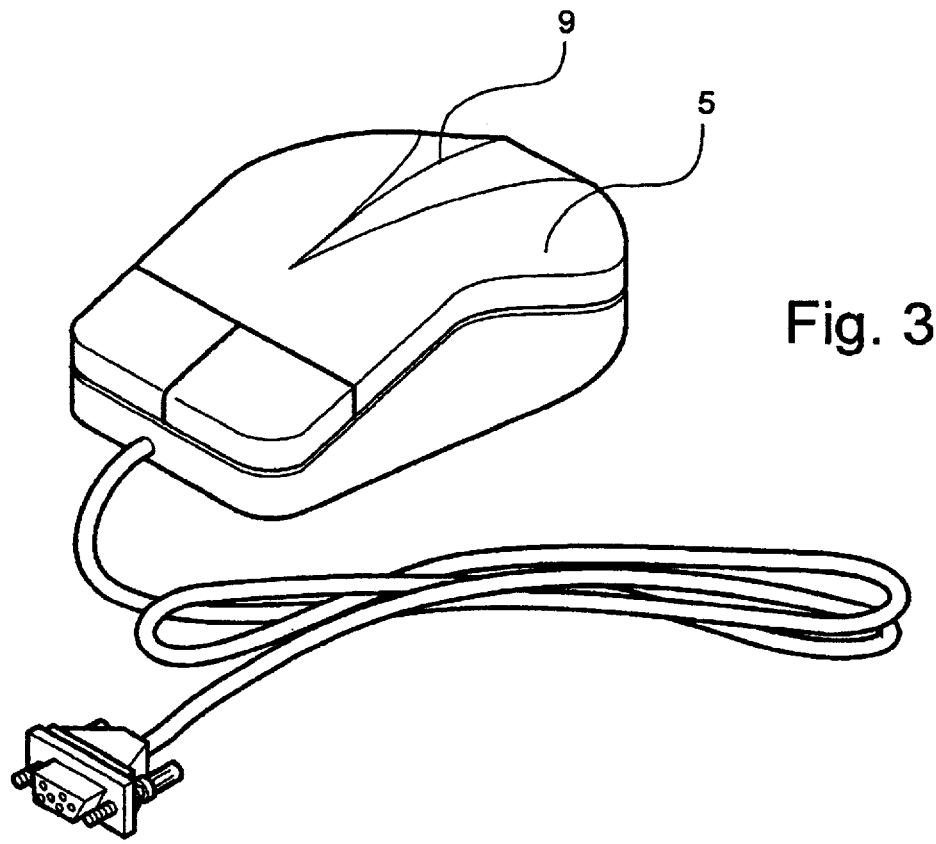
FIG. 3 is the contour design diagram.

As illustrated in these diagrams, the new product is a composite mouse assembly which is composed of the following parts:

1. the corded mouse (4) which includes the computer interface encoder (7), positional sensor (8) and case (5).

2. the transmitter (1), receiver (2), decoder (3) and the case of transmitter. Receiver (2), decoder (3) and corded mouse (4) are placed in the same case (5). They share the same computer interface encoder (7) located in the corded mouse by taking advantage of the digital-to-analog (DAC) converter (6). The formation of the DAC are as follows:

1. pin 1 of 74HC14, the negative pin of D5, one pin of C4 and one pin of R5 are connected together.
2. pin 2 and 3 of 74HC14, another pin of R4 and R5 are connected together.
3. pin 4 of 74HC14 is connected with pins 4 and 11 of both U3-CD4066 and U4-CD4066.
4. pin 5 of 74HC14, another pin of R5, one pin of C5 are connected together.
5. pin 6 of 74HC14 is connected with the pin 1 and pin 8 of both U3-CD4066 and U4-CD4066.
6. pin 10 of 74HC14 is connected to the positive pin of D5.
7. pin 11 of 74HC14, another pin of R2 and one pin of C3 and R3 are connected together.
8. Another pin of R3 and C3 C4 C5 are connected together. They are also connected to pin 3 of receiver (2) and the pin 1 of decoder (3) and the pin VSS of computer interface encoder (7) located in the corded mouse (4).
9. Another pin of R2 is connected to the negative pin of D1 D2 D3 and D4.
10. The positive pin of D1 is connected to the pin 5 and 6 of U4 and pin 3 of the decoder (3).
11. The positive pin of D2, pin 12 and 13 of U4 and pin 4 of the decoder (3) are connected together.
12. The positive pin of D3, pin 5 and 6 of U3 and the pin 5 of the decoder (3) are connected together.
13. The positive pin of D4, pin 12 and 13 of U3 and pin 6 of the decoder (3) are connected together.
14. Pins 2 and 3 of U3 are connected together. They are then connected to pin 12 of the decoder (3) through a resistor R3.
15. Pins 9 and 10 of U3 and the pin of 13 of the computer interface encoder (7) are connected together.
16. Pins 2 and 3 of U4 and the pin of 16 of the computer interface encoder (7) are connected together.
17. Pins 9 and 10 of U4 and the pin of 15 of the computer interface encoder (7) are connected together.

There are protruding veinings designed on the case of the surface of the composite mouse and a frame is attached with the mouse.

The working procedure of the product is a follows:

According to various wireless communication methods (such as infrared or radio frequency etc.), the receiver unit (2) will receive and amplify the digital serial encoded signals transmitted by the remote controller. The decoder (3) will interpret these signals transferred from the receiver (2) to get the decoded control signals. These control signals include: up, down, left, right, keypad I and keypad II (six combinations). Whenever the key on the remote controller is pressed, the corresponding signal in the decoder is activated until the key is released. In order to use the same interface with the traditional mouse, we need to use a directional signal to produce the specific waveforms which appears when the mouse moves in the same direction (the frequency stands for the moving speed and the phase differences stand for moving direction). In our case, 74HC14 and C4, R4 form the oscillator, its frequency determines the moving speed when used in remote control mode. C5 and R5 form the waveform delay mechanism to generate the second waveform which have the fixed phase difference. Two Integrated Circuit (IC) chips (CD4066) are utilized to cooperate with the four-direction signals (top, down, left, right) transmitted by the decoder to transfer the two series of waveforms with fixed phase differences to the input ports of the horizontal and vertical position sensors of the computer interface encoder. This accomplishes the Digital-to-analog conversion.

Figure 4:
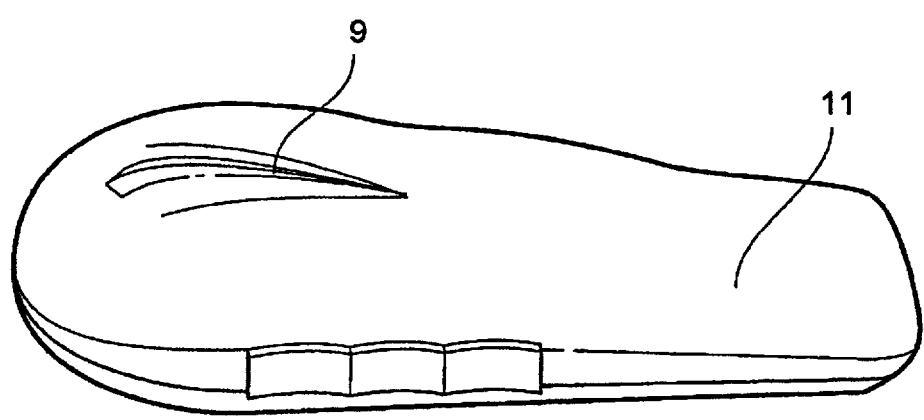
FIG. 4 is the contour design diagram of the remote controller.
Figure 5:
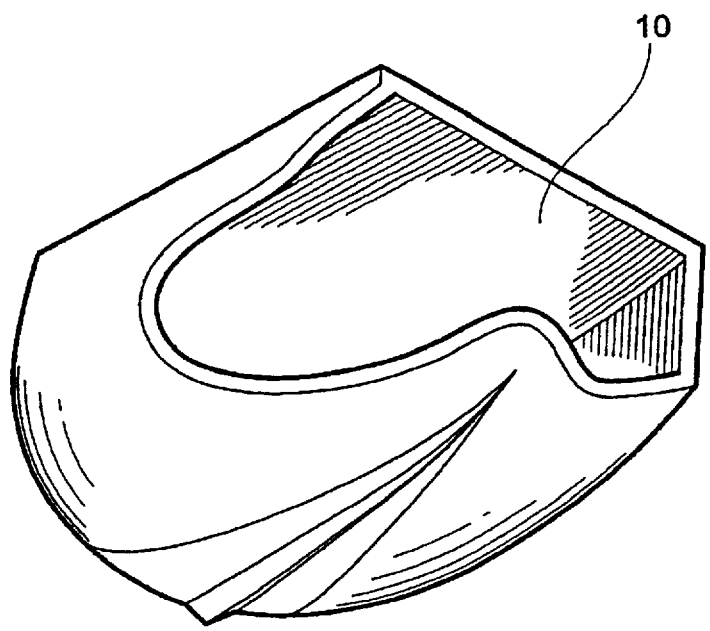
FIG. 5 is the contour design diagram of the frame.

When used in local operation mode, this product works the same way as the traditional mouse. When used in remote control mode, we can put the mouse on top of the computer or monitor and accomplish the operation using the remote controller (1). FIG. 4 is a contour design diagram of the casing (11) of the remote controller and showing the surface veinings (9) provided for enhancing the feel of the casing (11) in the hand of the user. FIG. 5 is a contour design diagram of a frame (10) used for storing the mouse.

A computer mouse assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A composite mouse assembly for a computer, comprising:
   (a) a mouse case;
   (b) a computer interface encoder contained in the mouse case;
   (c) positional sensor located within the mouse case and means connected to the interface encoder for controlling a screen indicator used for selecting menu items appearing on a display screen of the computer;
   (d) a wireless remote control device connected to the positional sensor means and including a plurality of user-activated direction control keys for transmitting digital serial encoded signals;
   (e) a receiver unit contained in the mouse case for receiving and amplifying the digital signals transmitted by the remote control device;
   (f) a decoder for interpreting the digital signals transferred by the receiver unit into one of a plurality digital direction control signals corresponding to the direction control keys of the remote control device; and
   (g) converter means for converting the digital direction control signals to analog signals, the analog signals being transferred to respective input ports of the positional sensor means of the interface encoder to control the position of the indicator on the display screen.

2. A composite mouse assembly according to claim 1, wherein said mouse case includes protruding veining on an outer surface thereof for enhancing the comfort of the case to the hand of a user.

3. A composite mouse assembly according to claim 1, wherein the mouse assembly is stored in a frame.

* * * * *